(12) United States Patent
Pediredla et al.

(10) Patent No.: US 9,710,959 B2
(45) Date of Patent: Jul. 18, 2017

(54) COMPRESSED 3D GRAPHICS RENDERING EXPLOITING PSYCHOVISUAL PROPERTIES

(71) Applicant: Intel Corporation, Santa Clara, CA (US)

(72) Inventors: Adithya K. Pediredla, Kakinada (IN); Pavan A. Kumar, Gudur (IN); Biju Puthur Simon, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 304 days.

(21) Appl. No.: 14/040,072

(22) Filed: Sep. 27, 2013

(65) Prior Publication Data

US 2015/0091902 A1    Apr. 2, 2015

(51) Int. Cl.
*G09G 5/02*     (2006.01)
*G06T 15/80*    (2011.01)
(Continued)

(52) U.S. Cl.
CPC ............ *G06T 15/80* (2013.01); *G06T 3/4015* (2013.01); *G06T 11/40* (2013.01)

(58) Field of Classification Search
CPC ......... G09G 5/02; G06T 11/001; G06T 5/001; G06T 9/005; H04N 7/50; H04N 7/26755;
(Continued)

(56) References Cited

U.S. PATENT DOCUMENTS 3,971,065 A    7/1976  Bayer
7,986,358 B1*  7/2011  Blais-Morin ............. G06T 1/00
                                                    348/273

(Continued)

OTHER PUBLICATIONS

Lian, N., Chang, L., & Tan, Y. P. (Sep. 2005): "Improved Color Filter Array Demosaicking by Accurate Luminance Estimation", In Image Processing, ICIP 2005. IEEE International Conference on (vol. 1) (pp. 1-4).*
Pei, S. C., & Tam, I. K. (2003): "Effective Color Interpolation in CCD Color Filter Arrays Using Signal Correlation", Circuits and Systems for Video Technology, IEEE Transactions on, 13(6), pp. 503-513.*
Lian, N. X., Chang, L., Tan, Y. P., & Zagorodnov, V. (2007): "Adaptive Filtering for Color Filter Array Demosaicking", Image Processing, IEEE Transactions on, 16(10), pp. 2515-2525.*
Jean, Réi, "Demosaicing with the Bayer Pattern," Dept. of Computer Science, Univ. of North Carolina, retrieved Jan. 1, 2010, 6 pages.
Li et al., "Color Filter Array Demosaicking Using High-Order Interpolation Techniques with a Weighted Median Filter for Sharp Color Edge Preservation," IEEE Transactions on Image Processing, vol. 18, No. 9, Sep. 2009, 12 pages.

(Continued)

*Primary Examiner* — Xiao Wu
*Assistant Examiner* — Sarah Lhymn
(74) *Attorney, Agent, or Firm* — Finch & Maloney PLLC

(57) ABSTRACT

Techniques are disclosed for providing compressed three-dimensional (3D) graphics rendering exploiting psychovisual properties of the human eye. In some embodiments, the techniques can be used to render one red-green-blue (RGB) channel per pixel location. In some example such cases, green pixels are rendered at one-half resolution, whereas red and blue pixels are rendered at one-quarter resolution. In some other embodiments, multiple RGB channels can be rendered at a given pixel location. In some example such cases, green pixels are rendered at full (e.g., actual) resolution, whereas red and blue pixels are rendered at one-quarter resolution. Missing RGB channel components can be interpolated using statistical and/or frequency domain properties of color spectra, in accordance with some embodiments. The techniques can be used, for example, to improve the power efficiency and/or rendered graphics quality of a graphics processing unit (GPU) or other rendering engine, in accordance with some embodiments.

25 Claims, 8 Drawing Sheets

(51) Int. Cl.
*G06T 3/40* (2006.01)
*G06T 11/40* (2006.01)

(58) Field of Classification Search
CPC . H04N 7/26106; H04N 1/4052; G06K 9/2018
USPC ....... 345/418, 581, 589, 591, 593, 594, 619;
382/162, 163, 166, 167, 232, 233, 234,
382/235, 238, 239, 244, 246, 247, 248,
382/252, 253
See application file for complete search history.

(56) References Cited

U.S. PATENT DOCUMENTS

| | | | |
|---|---|---|---|
| 2002/0135683 A1 | 9/2002 | Tamama et al. | |
| 2012/0229664 A1* | 9/2012 | Solomon ............ | H04N 5/23229 348/222.1 |
| 2012/0293677 A1* | 11/2012 | Ostrovsky ............ | H04N 5/3572 348/222.1 |
| 2013/0218531 A1* | 8/2013 | Deichmann ............ | A61C 9/004 703/1 |

OTHER PUBLICATIONS

Malvar et al., "High-Quality Linear Interpolation for Demosaicing of Bayer-Patterned Color Images," IEEE Int'l Conf. on Acoustics, Speech, and Signal Processing (ICASSP), Montreal, Québec, Canada, May 17-24, 2004, vol. 3, May 17, 2004, pp. 485-488, 4 pages.
Extended European Search Report received for European Patent Application No. 14186500.6, search dated Jun. 26, 2015, 9 pages.

* cited by examiner

COMPRESSED 3D GRAPHICS RENDERING EXPLOITING PSYCHOVISUAL PROPERTIES

BACKGROUND

Graphics processing involves a number of non-trivial challenges, and three-dimensional (3D) graphics rendering has faced particular complications, such as those with respect to managing power efficiency and rendering quality.

DETAILED DESCRIPTION

Figure 1:
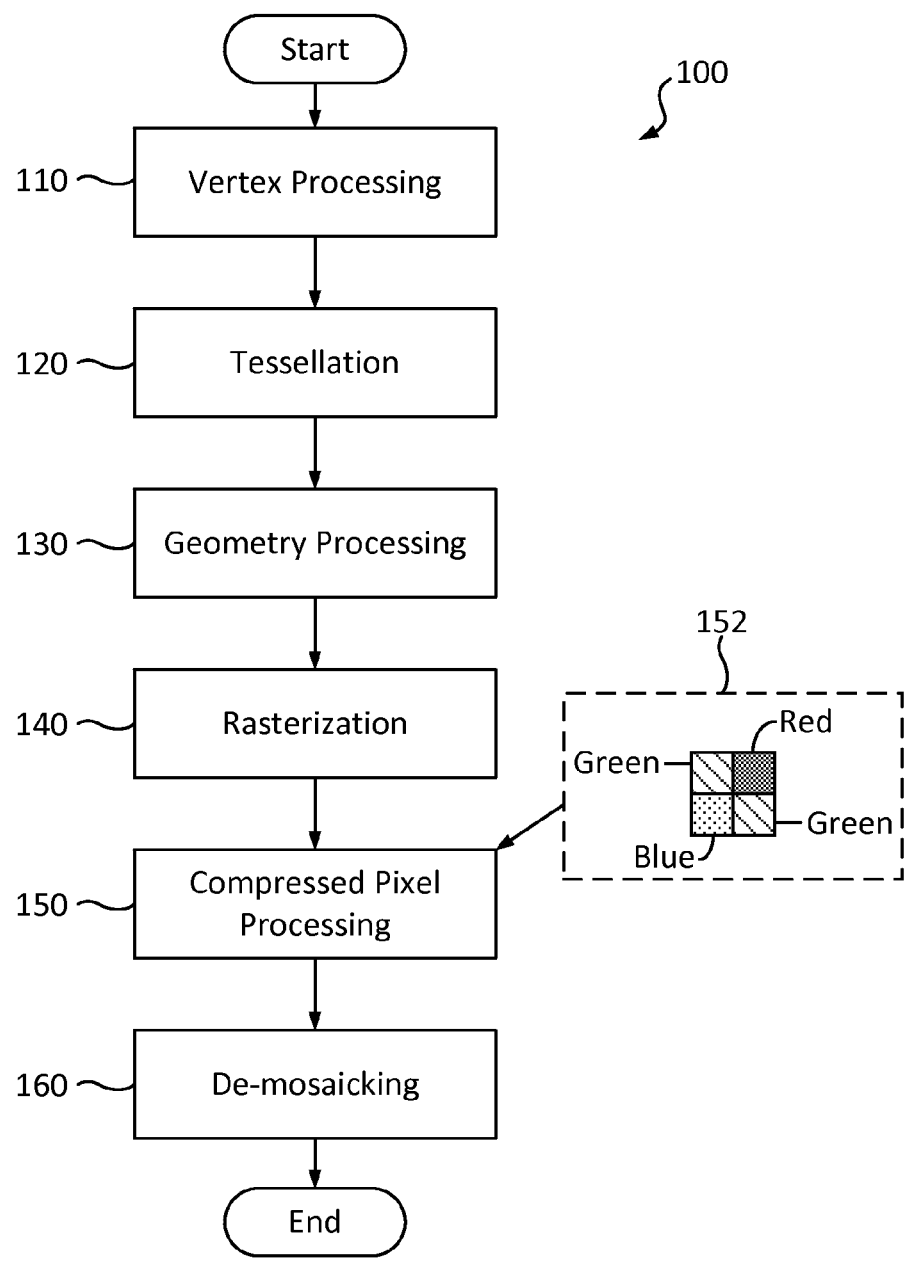
FIG. 1 is a three-dimensional (3D) graphics pipeline for compressed 3D graphics rendering, in accordance with an embodiment of the present disclosure.

Techniques are disclosed for providing compressed three-dimensional (3D) graphics rendering exploiting psychovisual properties of the human eye. In some embodiments, the techniques can be used to render one red-green-blue (RGB) channel per pixel location. In some example such cases, green pixels are rendered at one-half resolution, whereas red and blue pixels are rendered at one-quarter resolution. In some other embodiments, multiple RGB channels can be rendered at a given pixel location. In some example such cases, green pixels are rendered at full (e.g., actual) resolution, whereas red and blue pixels are rendered at one-quarter resolution. Missing RGB channel components can be interpolated using statistical and/or frequency domain properties of color spectra, in accordance with some embodiments. The techniques can be used, for example, to improve the power efficiency and/or rendered graphics quality of a graphics processing unit (GPU) or other rendering engine, in accordance with some embodiments. Numerous configurations and variations will be apparent in light of this disclosure.

General Overview

The continuing demand for low-power mobile devices which are capable of real-time three-dimensional (3D) graphics rendering poses a significant challenge, for example, to the predominantly client-based graphics processing unit (GPU) industry. Also, limited computing resources are a constraint on the ability to work in low power envelopes. Existing techniques which focus on power reduction, such as tiled rendering and lossy compression of memory traffic, do so at the sacrifice of rendered image quality or performance.

Thus, and in accordance with an embodiment of the present disclosure, techniques are disclosed for providing compressed three-dimensional (3D) graphics rendering. In accordance with some embodiments, the disclosed techniques may exploit one or more psychovisual properties of the human eye, as will be discussed herein. In some instances, the disclosed techniques may be used, for example, to render only one red-green-blue (RGB) channel per pixel location. In some example such cases, the green channel may be sampled at a higher frequency (e.g., at one-half resolution) than the red and blue channels (e.g., at one-quarter resolution), and luminance data may be utilized to interpolate missing RGB channel values. Adaptive filtering may be utilized to that end, in some embodiments. In some other instances, the disclosed techniques may be used, for example, to render multiple RGB channels at some pixel locations. In some example such cases, the green channel may be sampled at full resolution (e.g., at actual resolution), whereas the red and blue channels may be sampled at partial resolution (e.g., at one-quarter resolution), and data pertaining to primary color differences (PCDs) may be utilized to interpolate missing RGB channel values. Bilinear interpolation may be utilized to that end, in some embodiments. In a more general sense, to provide the full graphics, missing RGB channel components may be interpolated, for example, using statistical properties of color spectra and/or frequency domain properties of color spectra, in accordance with some embodiments.

Regarding psychovisual properties, the human eye normally does not respond to all visual information with equal sensitivity. Physiologically, two types of photoreceptor cells are normally present in the human eye—cone cells and rod cells. Cone cells are the primary source of color information, and human eyes normally have three types of cone cells, which detect different wavelength ranges approximately corresponding with red, green, and blue light, and thus provide for trichromatic vision. As a result of the non-uniform distribution of the various types of cone cells in the human eye, eye response can be higher for green spectra than for red spectra or blue spectra. Consequently, the human eye can be more sensitive to errors in green color than in red or blue colors. Rod cells are the primary source of visual information under low-light conditions and thus provide for scotopic vision. The quantity of rod cells normally outnumbers the quantity of cone cells. Consequently, the human eye can be more sensitive to intensity information than to color information. In part, this may account for why humans, for example, can identify the effects of multisample anti-aliasing (MSAA) and can readily detect blur/aliasing effects in graphics rendering. Thus, and in accordance with some embodiments, these physiological phenomena can be exploited to allow for information which is psychovisually redundant (e.g., has relatively less importance for the quality of image perception) to be omitted from a 3D graphics rendering process flow with minimal or otherwise negligible difference to the human eye in the rendered graphics produced.

Some embodiments can be used, for example, to optimize or otherwise improve power efficiency. For example, some embodiments may provide for a decrease in pixel shader cost, thereby decreasing power consumption in the rendering process. In some instances, this may be done with minimal or otherwise negligible loss of visual quality of the rendered graphics output by a given graphics processor unit (GPU) or other rendering engine. In some cases, the reduced power usage may improve the performance of the GPU/rendering engine given the lesser amount of rendering work to be done.

Some embodiments can be used, for example, to improve power efficiency while optimizing or otherwise improving rendered graphics quality. For example, some embodiments may provide for a decrease in pixel shader cost which is of a comparatively lesser degree as compared to the decrease provided by an approach which seeks to optimize power efficiency. The decrease in pixel shader cost may decrease power consumption. At the same time, the additional pixel shader cost can be utilized to provide for an improvement in visual quality of the rendered graphics output by a given GPU or other rendering engine. Thus, in this sense, a slightly lesser decrease in pixel shader cost may be traded for a higher quality rendered graphics output, in accordance with some embodiments, as compared with an approach which seeks to optimize power efficiency. In some cases, the reduced power usage may improve the performance of the GPU/rendering engine given the lesser amount of rendering work to be done.

Some embodiments can be used, for example, to provide a faster and/or lower power graphics processor or other rendering engine. Some embodiments may be utilized, for example, in mobile devices, such as phones, tablets, gaming devices, or other suitable computing devices, as will be apparent in light of this disclosure. Some embodiments may be utilized, for example, in cases in which pixel density is relatively high and occasional cross-color artifacts are negligible or otherwise not perceivable by the human eye. Numerous suitable uses and applications will be apparent in light of this disclosure.

In accordance with some embodiments, use of the disclosed techniques may be detected, for example, by performance inspection/evaluation of a given 3D graphics rendering hardware. The rendered graphics as output by the hardware can be compared with the original graphics generated by reference rasterizers and/or conformance tests, and the channel peak signal-to-noise ratio (PSNR) for the RGB channels can be computed separately. If, for example, the green channel PSNR is higher than the PSNR of the red and blue channels, then the hardware may be utilizing one or more of the compressed 3D graphics rendering techniques described herein.

Power-Optimized Compressed Rendering Methodology

Figure 2:
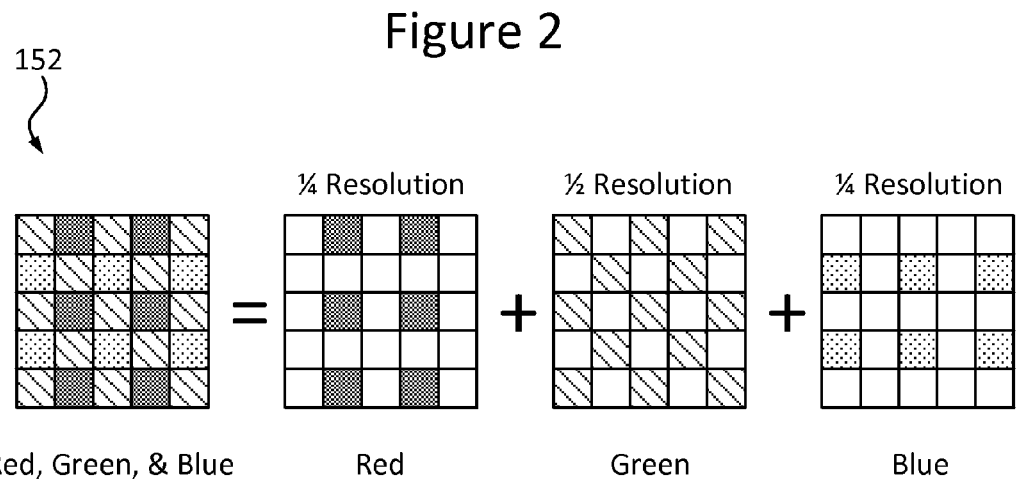
FIG. 2 illustrates a color mask configured in accordance with an embodiment of the present disclosure.

FIG. 1 is a three-dimensional (3D) graphics pipeline 100 for compressed 3D graphics rendering, in accordance with an embodiment of the present disclosure. As can be seen, pipeline 100 may begin with vertex processing, tessellation, geometry processing, and rasterization, as in blocks 110, 120, 130, and 140, each of which may be performed as traditionally done. Thereafter, pipeline 100 may proceed with compressed pixel processing, as in block 150. Compressed pixel processing can be performed by a compressed pixel processing module 151 (e.g., depicted in FIG. 7A), which may include custom, proprietary, known, and/or after-developed image/video processing code or instruction sets that are generally well-defined and operable, for example, to process only one RGB channel per pixel. To this end, a color mask 152 may be selected to specify which channel is to be rendered at a given pixel location. For example, consider FIG. 2, which illustrates a color mask 152 configured in accordance with an embodiment of the present disclosure. As can be seen, color mask 152 is provided in a Bayer-type shading pattern and configured to: (1) render red and blue at ¼ (one-quarter) resolution; and (2) render green at ½ (one-half) resolution. In accordance with an embodiment, compressed pixel processing module 151 processes only one of the RGB channels as determined by the particular color mask 152 utilized. Other suitable configurations for color mask 152 will depend on a given application and will be apparent in light of this disclosure.

Returning to FIG. 1, during compressed pixel processing 150 in 3D graphics pipeline 100, a reduced quantity of color values may be computed based on the limited RGB channel data processed (e.g., subjected to pixel shading). To produce the final rendered 3D graphics from this intermediate render target data, the missing RGB channel values (e.g., those left unprocessed by compressed pixel processing module 151 and thus not subjected to pixel shading) may be reconstructed, in accordance with an embodiment. To that end, pipeline 100 may proceed with de-mosaicking, as in block 160. De-mosaicking can be performed by a de-mosaicking module 171 (e.g., depicted in FIG. 7A) configured, for example, to implement any one or more suitable de-mosaicking algorithms, as will be apparent in light of this disclosure. For example, a given graphics processing unit (GPU) or other rendering engine may utilize a hardware implementation of a de-mosaicking algorithm in one or more of its media pipelines. Such a de-mosaicking algorithm, in turn, can be utilized by de-mosaicking module 171, in accordance with an embodiment. Other suitable algorithms which can be utilized by de-mosaicking module 171 to perform the desired de-mosaicking will be apparent in light of this disclosure.

Figure 3:
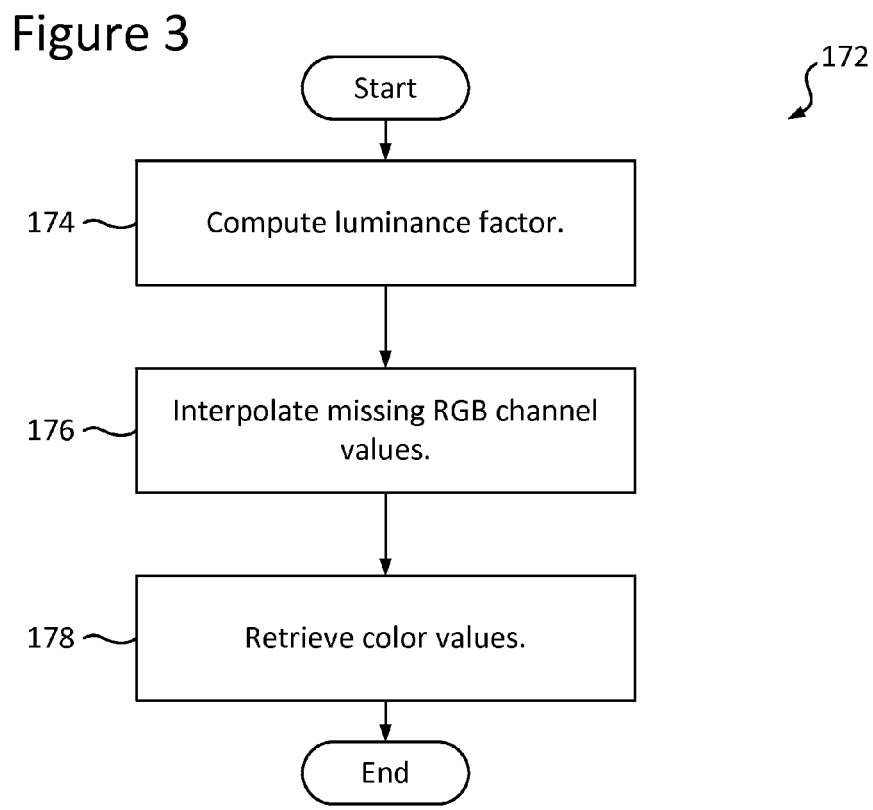
FIG. 3 illustrates an interpolation algorithm, in accordance with an embodiment of the present disclosure.

In some cases, the de-mosaicking algorithm implemented by de-mosaicking module 171 (e.g., algorithm 172, discussed below) may be one which interpolates missing values and thus can be utilized to reconstruct the missing RGB channel values. In this sense, de-mosaicking module 171 can be considered a reconstruction module which reconstructs the 3D graphics data, in some embodiments. For example, consider FIG. 3, which illustrates an interpolation algorithm 172, in accordance with an embodiment of the present disclosure. As can be seen, the interpolation algorithm 172 may begin with computing the luminance factor, as in block 174. Luminance at full resolution may be calculated, for example, using the following relationship:

$$L(x, y) = \frac{1}{4}(R(x, y) + 2G(x, y) + B(x, y)),$$

where L is luminance and where R, G, and B refer to red, green, and blue pixels, respectively. Statistically, horizontal and vertical frequencies contribute more to luminance than diagonal frequencies. Thus, and in accordance with an embodiment, use can be made of an adaptive filter, for example, that is elongated in the horizontal and vertical directions to estimate the luminance values at green pixels, and the remaining luminance values at red and blue pixels may be computed using the gradient of luminance of the neighboring pixels. In some cases, the luminance at green pixels may be computed, for example, by filtering green pixels captured with the following filter:

$$\begin{pmatrix} 0 & 1 & -2 & 1 & 0 \\ 1 & -4 & 6 & -4 & 1 \\ -2 & 6 & 56 & 6 & -2 \\ 1 & -4 & 6 & -4 & 1 \\ 0 & 1 & -2 & 1 & 0 \end{pmatrix} \Big/ 64.$$

The luminance at both red and blue pixels may be interpolated adaptively based on the luminance values of green pixels neighboring those red and blue pixels, in accordance with an embodiment.

The adaptive filtering algorithm 172 may continue as in block 176 with interpolating the missing RGB channel values using the resultant luminance values produced in block 174. This may be done, for example, by first computing $\Delta_{LC}=L_C-C_C$, where C={R,G,B} and then evaluating $\widehat{\Delta_{LC}}=f(\Delta_{LC})$, where f is a bilinear interpolator. Thereafter, the adaptive filtering algorithm 172 may proceed as in block 178 with retrieving the missing color values based on the resultant interpolated values. In accordance with some embodiments, the missing color components at original resolution can be computed, for example, using the following relationship: $C=L+\widehat{\Delta_{LC}}$. As a result of this computation, the final render target data (e.g., the remaining quantity of color values based on the interpolated RGB channel data) may be produced and output for downstream use, in accordance with some embodiments.

In accordance with some embodiments, using the compressed 3D graphics rendering flow provided by 3D graphics pipeline 100, for example, at 50% pixel shading cost (e.g., two out of four channels of RGB-alpha are disabled) may result in a minimal or otherwise negligible image difference (as between a reference image and the reconstructed image), as detectable by the human eye. For example, the channel peak signal-to-noise ratio (PSNR) may be in the range of about 30-50 dB (e.g., about 30-35 dB, about 35-40 dB, about 40-45 dB, about 45-50 dB, or any other sub-range in the range of about 30-50 dB), in accordance with some embodiments. In some instances, a given channel PSNR may be greater than or equal to about 30 dB. In some cases, the average channel PSNR may be about 40 dB±5 dB. Other suitable ranges for the channel PSNR will depend on a given application and will be apparent in light of this disclosure.

Thus, in some embodiments, the compressed 3D graphics rendering flow provided by 3D graphics pipeline 100 may provide for reduced power consumption by a given host GPU or other rendering engine with minimal or otherwise negligible rendered graphics quality loss. In a more general sense, the compressed 3D graphics rendering flow provided by 3D graphics pipeline 100 may be considered, for example, a power-optimized compressed 3D graphics rendering methodology.

Numerous variations on this methodology will be apparent in light of this disclosure. As will be appreciated, and in accordance with an embodiment, each of the functional boxes (e.g., 110, 120, 130, 140, 150, and 160) shown in FIG. 1 can be implemented, for example, as a module or sub-module that, when executed by one or more processors or otherwise operated, causes the associated functionality as described herein to be carried out. To this end, the modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.).

Quality-Optimized Compressed Rendering Methodology

Generally speaking, the compressed 3D graphics rendering methodology discussed above seeks to decrease pixel shading cost to improve performance and decrease power consumption with minimal or otherwise negligible loss of visual quality of the output of the rendering engine, in accordance with some embodiments. To that end, the power-optimized methodology discussed above utilizes a Bayer-type color mask pattern or other imaging pattern in which a single color sample is rendered at a given pixel location. However, as will be appreciated in light of this disclosure, in 3D graphics, each channel may be rendered independently of other channels. This understanding, along with statistical properties of images (discussed below), may be exploited to render comparatively higher-quality compressed 3D graphics, in some instances. Thus, the compressed 3D graphics rendering techniques discussed below are, in a sense, a quality-optimized variation of those power-optimized techniques discussed above. More particularly, the quality-optimized compressed 3D graphics rendering methodology discussed herein permits a comparatively lesser pixel shading cost reduction as compared to the power-optimized compressed 3D graphics rendering methodology discussed herein to allow for the opportunity to output comparatively higher-quality rendered graphics, in some cases.

Figure 4:
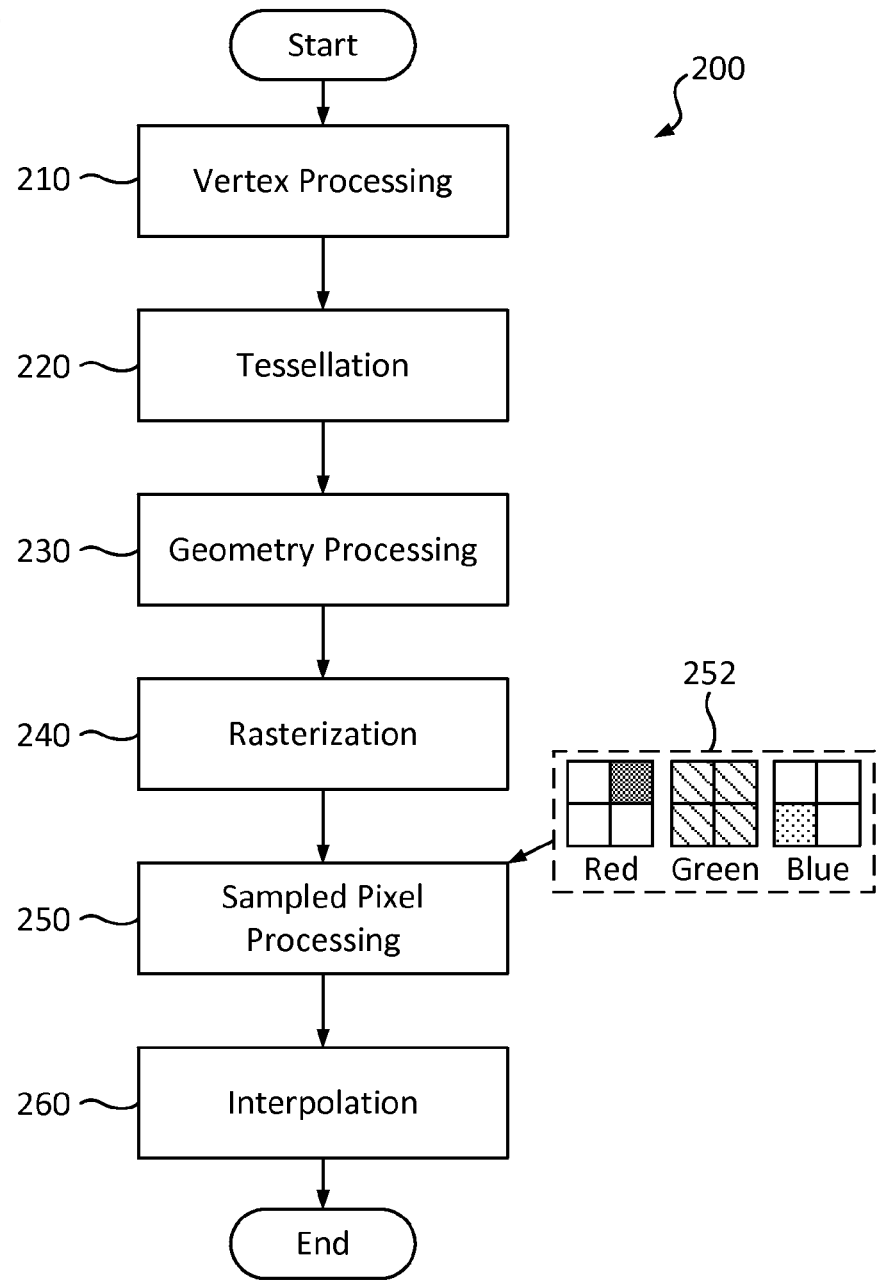
FIG. 4 is a 3D graphics pipeline for compressed 3D graphics rendering, in accordance with another embodiment of the present disclosure.
Figure 5:
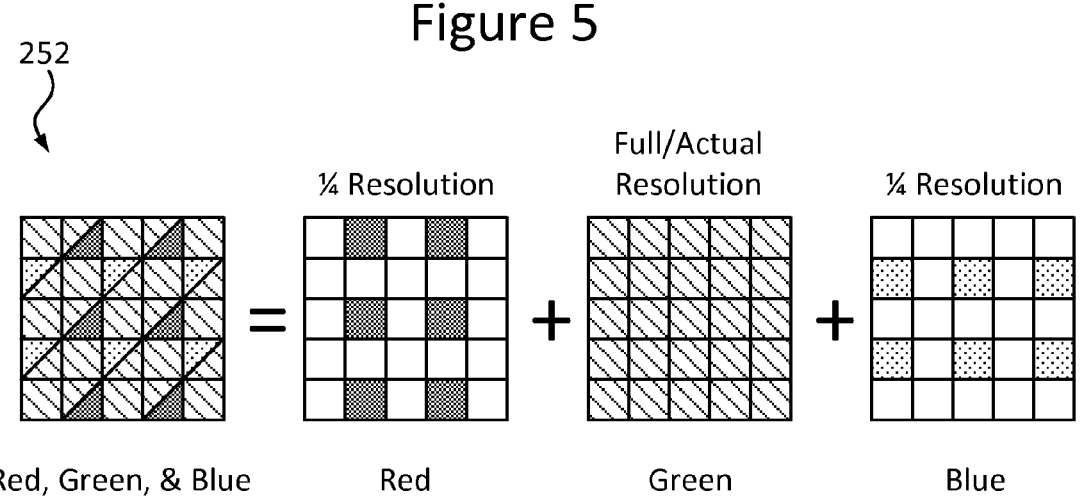
FIG. 5 illustrates a color mask configured in accordance with another embodiment of the present disclosure.

FIG. 4 is a 3D graphics pipeline 200 for compressed 3D graphics rendering, in accordance with another embodiment of the present disclosure. As can be seen, pipeline 200 may begin with vertex processing, tessellation, geometry processing, and rasterization, as in blocks 210, 220, 230, and 240, respectively, each of which may be performed as traditionally done. Thereafter, pipeline 200 may proceed with sampled pixel processing, as in block 250. Sampled pixel processing can be performed by a sampled pixel processing module 251 (e.g., depicted in FIG. 7A), which may include custom, proprietary, known, and/or after-developed image/video processing code or instruction sets that are generally well-defined and operable, for example, to render one channel at full resolution and the remaining channels at partial resolution. To this end, a color mask 252 may be selected to specify which channel or channels are to be rendered at a given pixel location. For example, consider FIG. 5, which illustrates a color mask 252 configured in accordance with another embodiment of the present disclosure. As can be seen, color mask 252 is provided in a shading pattern configured to: (1) uniformly render red and blue at ¼ (one-quarter) resolution; and (2) render green at complete (e.g., actual) resolution. As will be appreciated in light of this disclosure, color mask 252 differs from the color mask 152, discussed above, in that it is configured to render multiple color samples in some pixel locations. In accordance with an embodiment, sampled pixel processing module 251 processes the RGB channels as determined by the particular color mask 252 utilized. Other suitable configurations for color mask 252 will depend on a given application and will be apparent in light of this disclosure.

Returning to FIG. 4, during sampled pixel processing 250 in 3D graphics pipeline 200, a reduced quantity of color values may be computed based on the limited RGB channel data processed (e.g., subjected to pixel shading). To produce the final rendered 3D graphics from this intermediate render target data, the missing RGB channel values (e.g., those left unprocessed by sampled pixel processing module 251 and thus not subjected to pixel shading) may be reconstructed, in accordance with an embodiment. To that end, pipeline 200 may proceed with interpolation, as in block 260. Interpolation can be performed by an interpolation module 271 (e.g., depicted in FIG. 7A) configured, for example, to implement any one or more suitable interpolation algorithms, as will be apparent in light of this disclosure. Other suitable algorithms which can be utilized by interpolation module 271 to perform the desired interpolation will be apparent in light of this disclosure.

Figure 6:
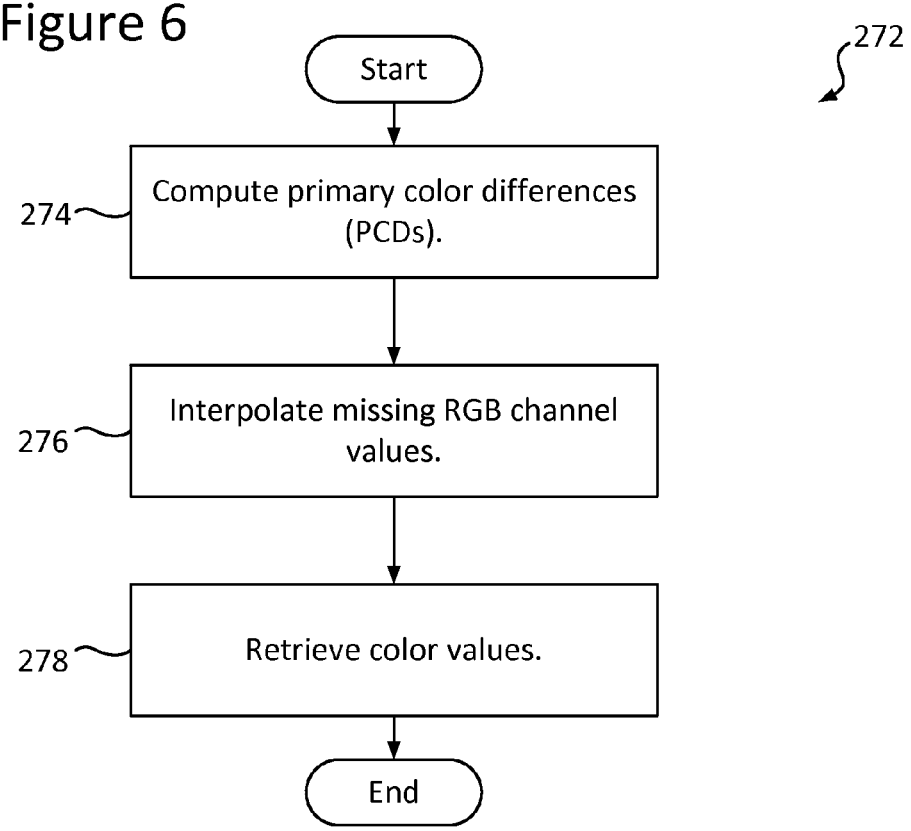
FIG. 6 illustrates an interpolation algorithm, in accordance with another embodiment of the present disclosure.

In some cases, the interpolation algorithm implemented by interpolation module 271 (e.g., algorithm 272, discussed below) may be one which interpolates missing values and thus can be utilized to reconstruct the missing RGB channel values. In this sense, interpolation module 271 can be considered a reconstruction module which reconstructs the 3D graphics data, in some embodiments. For example, consider FIG. 6, which illustrates an interpolation algorithm 272, in accordance with another embodiment of the present disclosure. As can be seen, the interpolation algorithm 272 may begin with computing primary color differences (PCDs), as in block 274. The PCDs may be calculated, for example, using the following relationships: $\Delta_{GB_r}=G_r-B_r$, and $\Delta_{GR_r}=G_r-R_r$, where $R_r$, $G_s$, and $B_r$ are initial samples, r represents ¼ (one-quarter) resolution samples, and s represents full (actual) resolution samples. Statistically, PCDs are low-pass signals. Thus, and in accordance with an embodiment, use can be made of this statistical property, for example, to interpolate the sampled PCDs (e.g., available at ¼ resolution) to original (e.g., screen) resolution using any suitable interpolation methodology, as will be apparent in light of this disclosure. In some cases, bilinear interpolation can be used.

The interpolation algorithm 272 may continue as in block 276 with interpolating the missing RGB channel values. This may be performed, for example, using the following relationships: $\widetilde{\Delta_{GR_s}}=f(\Delta_{GR_r})$ and $\widetilde{\Delta_{GB_s}}=f(\Delta_{GB_r})$, where f is a bilinear interpolator. Thereafter, the interpolation algorithm 272 may proceed as in block 278 with retrieving color values based on the resultant interpolated values. In accordance with some embodiments, the missing color components at original resolution can be computed, for example, using the following relationships: $R_{s-r}=G_{s-r}+\widetilde{\Delta_{GR_{s-r}}}$ and $B_{s-r}=G_{s-r}+\widetilde{\Delta_{GB_{s-r}}}$. Thus, and in accordance with some embodiments, the missing red and blue components may be computed by adding green channel intensities to the estimated PCDs, in accordance with some embodiments. As a result of these computations, the final render target data (e.g., the remaining quantity of color values based on the interpolated RGB channel data) may be produced and output for downstream use, in accordance with some embodiments.

In accordance with some embodiments, using the compressed 3D graphics rendering flow provided by 3D graphics pipeline 200, for example, at 62% pixel shading cost (e.g., one or two out of four channels of RGB-alpha are disabled) may result in a minimal or otherwise negligible image difference (as between a reference image and the reconstructed image), as detectable by the human eye. For example, the channel peak signal-to-noise ratio (PSNR) may be in the range of about 30-50 dB (e.g., about 30-35 dB, about 35-40 dB, about 40-45 dB, about 45-50 dB, or any other sub-range in the range of about 30-50 dB), in accordance with some embodiments. In some instances, a given channel PSNR may be greater than or equal to about 30 dB. In some cases, the average channel PSNR may be about 43.5 dB ±5 dB. Also, in some instances, the S-CIELAB visual quality difference metric may be less than or equal to about 1.5 (e.g., about 1.3-1.5, about 1.1-1.3, or any other sub-range that is less than or equal to about 1.5) and have a mean of about 0.3±0.1. Other suitable ranges for the channel PSNR and/or S-CIELAB metric will depend on a given application and will be apparent in light of this disclosure.

Thus, in some embodiments, the compressed 3D graphics rendering flow provided by 3D graphics pipeline 200 may provide for reduced power consumption by a given host GPU or other rendering engine. However, power savings associated with 3D graphics pipeline 200 may be, in some instances, of a comparatively lesser degree than power savings associated with 3D graphics pipeline 100. That is, in some cases, pipeline 200 may have a pixel shading cost which is comparatively higher than pipeline 100 (e.g., if more green channels are permitted to be rendered in pipeline 200 as compared to pipeline 100). It should be noted, however, that this additional pixel shader cost may allow for accurately calculated PCDs, which in turn can be utilized to provide for comparatively better quality rendered 3D graphics, for example, as compared with an approach which seeks to optimize power efficiency. Thus, in this sense, pipeline 200 may trade slightly higher power consumption (e.g., by way of a slightly higher pixel shader cost) as compared to pipeline 100, for example, for the sake of providing rendered 3D graphics output of comparatively higher visual quality as compared to the output of pipeline 100, in accordance with some embodiments. In a more general sense, the compressed 3D graphics rendering flow provided by 3D graphics pipeline 200 may be considered, for example, a quality-optimized compressed 3D graphics rendering methodology.

Numerous variations on this methodology will be apparent in light of this disclosure. As will be appreciated, and in accordance with an embodiment, each of the functional boxes (e.g., 210, 220, 230, 240, 250, and 260) shown in FIG. 4 can be implemented, for example, as a module or sub-module that, when executed by one or more processors or otherwise operated, causes the associated functionality as described herein to be carried out. To this end, the modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.).

Example System

Figure 7A:
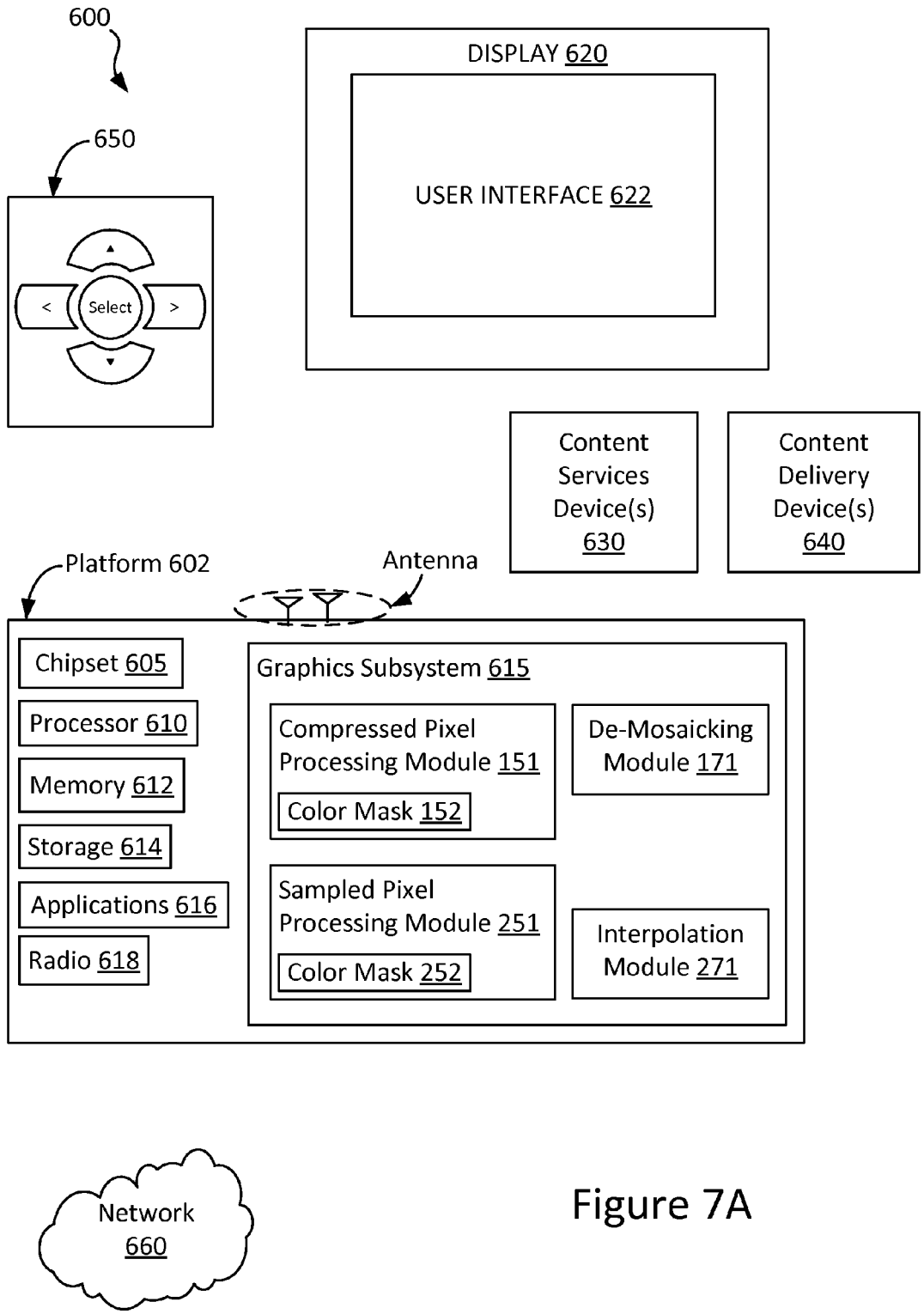
FIG. 7A illustrates an example system that may carry out the techniques for compressed 3D graphics rendering as described herein, in accordance with some embodiments.

FIG. 7A illustrates an example system 600 that may carry out the techniques for compressed 3D graphics rendering as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images/graphics such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The techniques for compressed 3D graphics rendering described herein may be implemented in various hardware architectures. For example, the techniques for compressed 3D graphics rendering as provided herein may be integrated within a graphics and/or video chipset. Alternatively, a discrete security processor may be used. In still another embodiment, the graphics and/or video functions including the techniques for compressed 3D graphics rendering may be implemented by a general purpose processor, including a multi-core processor.

Figure 7B:
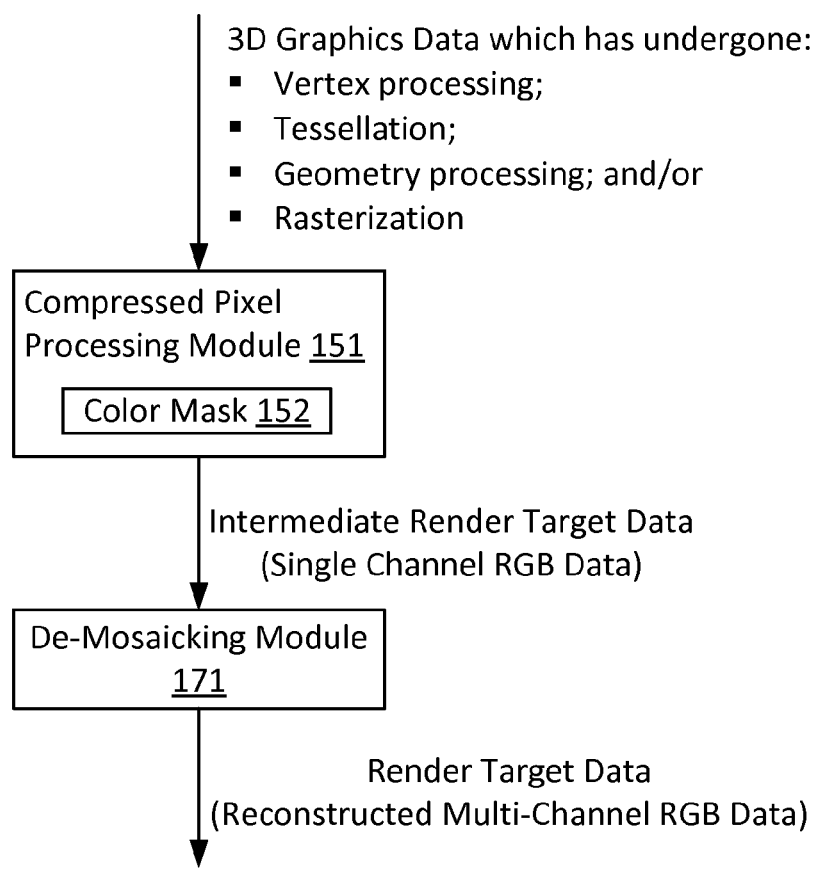
FIG. 7B illustrates an example 3D graphics data flow, in accordance with an embodiment of the present disclosure.

In accordance with some embodiments, graphics subsystem 615 may host one or more of the graphics processing modules discussed herein, such as compressed pixel processing module 151, de-mosaicking module 171, sampled pixel processing module 251, and/or interpolation module 271. Included modules may be configured to communicate with one another so as to permit 3D graphics data to be transferred there between, for example, during compressed 3D graphics rendering or other processing. For instance, consider FIG. 7B, which illustrates an example 3D graphics data flow, in accordance with an embodiment of the present disclosure. As can be seen, 3D graphics data which has undergone at least one of vertex processing, tessellation, geometry processing, and/or rasterization (discussed above) may be received, for example, by compressed pixel processing module 151. Color mask 152 may be applied to the received 3D graphics data, and the resultant intermediate render target data (e.g., single channel RGB data) may be output, for example, to de-mosaicking module 171. In turn, de-mosaicking module 171 may reconstruct the missing RGB channel data (e.g., using one or more interpolation algorithms, such as an adaptive filtering algorithm which utilizes luminance factor calculations, discussed above). The resultant final render target data (e.g., multi-channel RGB data) then may be output for downstream use.

Figure 7C:
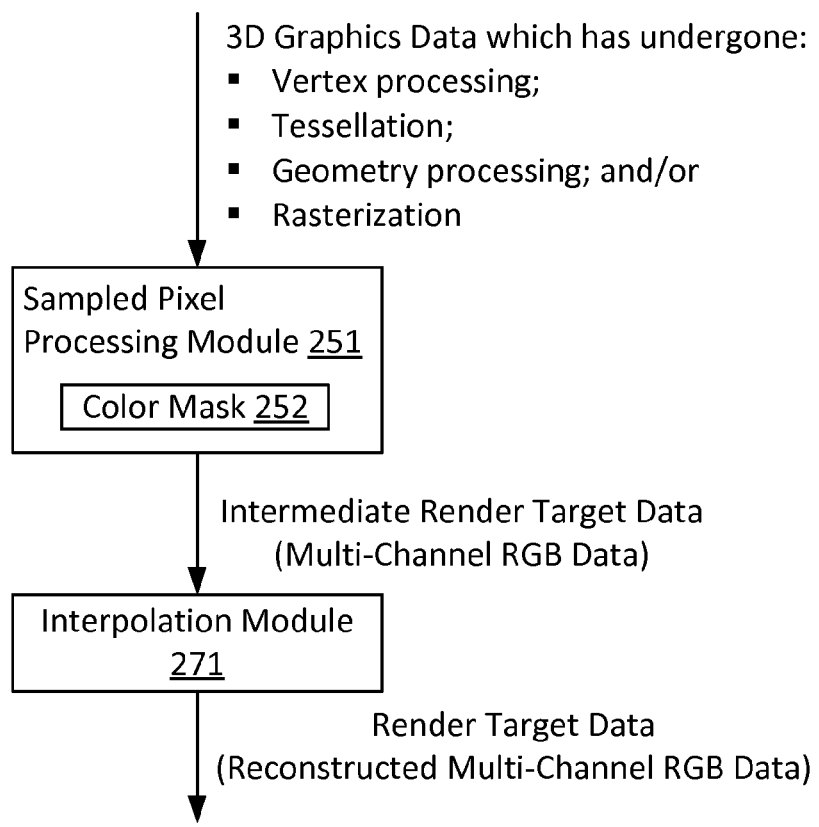
FIG. 7C illustrates an example 3D graphics data flow, in accordance with another embodiment of the present disclosure.

However, the present disclosure is not so limited. For instance, consider FIG. 7C, which illustrates an example 3D graphics data flow, in accordance with another embodiment of the present disclosure. As can be seen here, 3D graphics data which has undergone at least one of vertex processing, tessellation, geometry processing, and/or rasterization (discussed above) may be received, for example, by sampled pixel processing module 251. Color mask 252 may be applied to the received 3D graphics data, and the resultant intermediate render target data (e.g., multi-channel RGB data) may be output, for example, to interpolation module 271. In turn, interpolation module 271 may reconstruct the missing RGB channel data (e.g., using one or more interpolation algorithms, such as a bilinear interpolation algorithm which utilizes PCD calculations, discussed above). The resultant final render target data (e.g., multi-channel RGB data) then may be output for downstream use.

Returning to FIG. 7A, radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touchscreen display, television-like device, and/or a television. Display 620 may be digital and/or analog. In some embodiments, display 620 may be a holographic or three-dimensional (3-D) display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone, Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for compressed 3D graphics rendering as described herein). The embodiments, however, are not limited to the elements or context shown or described in FIGS. 7A-7C.

Figure 8:
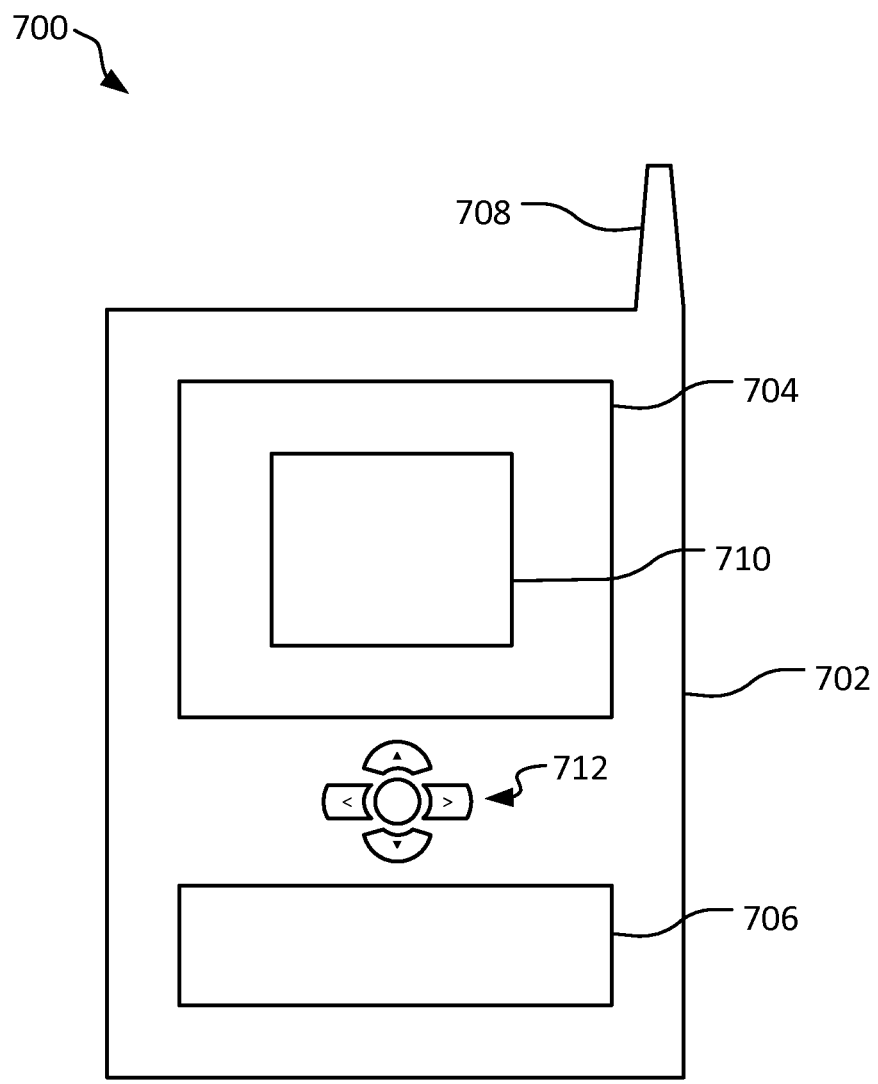
FIG. 8 illustrates embodiments of a small form factor device in which the system of FIG. 7A may be embodied.

As described above, system 600 may be embodied in varying physical styles or form factors. FIG. 8 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Further Example Embodiments

The following examples pertain to further embodiments, from which numerous permutations and configurations will be apparent.

Example 1 is a graphics processing architecture comprising: a pixel processing module configured to process three-dimensional (3D) graphics data with a color mask having a shading pattern which renders green pixels at a higher resolution than red pixels and blue pixels; and a reconstruction module configured to receive 3D graphics data processed by the pixel processing module and to reconstruct missing red-green-blue (RGB) channel values.

Example 2 includes the subject matter of any of Examples 1, 4, 6-10, and 15-16, wherein the shading pattern of the color mask Renders green pixels at ½ (one-half) resolution and renders red pixels and blue pixels at ¼ (one-quarter) resolution.

Example 3 includes the subject matter of any of Examples 1, 5, and 11-16, wherein the shading pattern of the color mask renders green pixels at actual resolution and renders red pixels and blue pixels at ¼ (one-quarter) resolution.

Example 4 includes the subject matter of any of Examples 1-2, 6-10, and 15-16, wherein the reconstruction module is configured with a de-mosaicking algorithm that interpolates missing values utilizable in reconstructing missing RGB channel values.

Example 5 includes the subject matter of any of Examples 1, 3, and 11-16, wherein the reconstruction module is configured with an interpolation algorithm that interpolates missing values utilizable in reconstructing missing RGB channel values.

Example 6 includes the subject matter of any of Examples 1-2, 4, 7-10, and 15-16, wherein the reconstruction module is configured to: calculate luminance at green pixels; interpolate missing RGB channel values from the resultant luminance calculation; and retrieve color values at original resolution based on the resultant interpolated RGB channel values.

Example 7 includes the subject matter of Example 6, wherein the luminance at green pixels is calculated by $$L(x, y) = \frac{1}{4}(R(x, y) + 2G(x, y) + B(x, y)),$$

where L is luminance, R refers to red pixels, G refers to green pixels, and B refers to blue pixels.

Example 8 includes the subject matter of Example 7, wherein the luminance at green pixels is calculated using an adaptive filter configured to filter green pixels captured with the filter:

$$\begin{pmatrix} 0 & 1 & -2 & 1 & 0 \\ 1 & -4 & 6 & -4 & 1 \\ -2 & 6 & 56 & 6 & -2 \\ 1 & -4 & 6 & -4 & 1 \\ 0 & 1 & -2 & 1 & 0 \end{pmatrix} \Big/ 64.$$

Example 9 includes the subject matter of Example 7, wherein missing RGB channel values are interpolated by computing $\Delta_{LC}=L_C-C_C$, where C={R,G,B}, and evaluating $\widehat{\Delta_{LC}}=f(\Delta_{LC})$, where f is a bilinear interpolator.

Example 10 includes the subject matter of Example 9, wherein color values are retrieved by evaluating $C=L+\widehat{\Delta_{LC}}$.

Example 11 includes the subject matter of any of Examples 1, 3, 5, and 12-16, wherein the reconstruction module is configured to: compute primary color differences (PCDs); interpolate missing RGB channel values from the resultant PCDs; and retrieve color values at original resolution based on the resultant interpolated RGB channel values.

Example 12 includes the subject matter of Example 11, wherein the PCDs are computed by $\Delta_{GB_r}=G_r-B_r$ and $\Delta_{GR_r}=G_r-R_r$, where $R_r$, $G_s$, and $B_r$ are initial samples, r represents ¼ (one-quarter) resolution samples, and s represents actual resolution samples.

Example 13 includes the subject matter of Example 12, wherein missing RGB channel values are interpolated by computing $\widehat{\Delta_{GR_s}}=f(\Delta_{GR_r})$ and $\widehat{\Delta_{GB_s}}=f(\Delta_{GB_r})$, where f is a bilinear interpolator.

Example 14 includes the subject matter of Example 13, wherein color values are retrieved by evaluating $R_{s-r}=G_{s-r}+\widehat{\Delta_{GR_{s-r}}}$ and $B_{s-r}=G_{s-r}+\widehat{\Delta_{GB_{s-r}}}$.

Example 15 is a graphics processing unit (GPU) including the subject matter of any of Examples 1-14.

Example 16 is a method of compressed three-dimensional (3D) graphics rendering, the method comprising: processing 3D graphics data with a color mask having a shading pattern which renders green pixels at a higher resolution than red pixels and blue pixels; and reconstructing red-green-blue (RGB) channel values missing from the processed 3D graphics data.

Example 17 includes the subject matter of any of Examples 16, 19-23, and 28-29, wherein the shading pattern of the color mask renders green pixels at ½ (one-half) resolution and renders red pixels and blue pixels at ¼ (one-quarter) resolution.

Example 18 includes the subject matter of any of Examples 16 and 24-29, wherein the shading pattern of the color mask renders green pixels at actual resolution and renders red pixels and blue pixels at ¼ (one-quarter) resolution.

Example 19 includes the subject matter of any of Examples 16-17, 20-23, and 28-29, wherein reconstructing missing RGB channel values comprises: calculating luminance at green pixels; interpolating missing RGB channel values from the resultant luminance calculation; and retrieving color values at original resolution based on the resultant interpolated RGB channel values.

Example 20 includes the subject matter of Example 19, wherein the luminance at green pixels is calculated by $$L(x, y) = \frac{1}{4}(R(x, y) + 2G(x, y) + B(x, y)),$$

where L is luminance, R refers to red pixels, G refers to green pixels, and B refers to blue pixels.

Example 21 includes the subject matter of Example 20, wherein the luminance at green pixels is calculated using an adaptive filter configured to filter green pixels captured with the filter:

$$\begin{pmatrix} 0 & 1 & -2 & 1 & 0 \\ 1 & -4 & 6 & -4 & 1 \\ -2 & 6 & 56 & 6 & -2 \\ 1 & -4 & 6 & -4 & 1 \\ 0 & 1 & -2 & 1 & 0 \end{pmatrix} / 64.$$

Example 22 includes the subject matter of Example 20, wherein missing RGB channel values are interpolated by computing $\Delta_{LC}=L_C-C_C$, where C={R,G,B}, and evaluating $\widehat{\Delta_{LC}}=f(\Delta_{LC})$, where f is a bilinear interpolator.

Example 23 includes the subject matter of Example 22, wherein color values are retrieved by evaluating $C=L+\widehat{\Delta_{LC}}$.

Example 24 includes the subject matter of any of Examples 16, 18, and 25-29, wherein reconstructing missing RGB channel values comprises: computing primary color differences (PCDs); interpolating missing RGB channel values from the resultant PCDs; and retrieving color values at original resolution based on the resultant interpolated RGB channel values.

Example 25 includes the subject matter of Example 24, wherein the PCDs are computed by $\Delta_{GB_r}=G_r-B_r$ and $\Delta_{GR_r}=G_r-R_r$, where $R_r$, $G_s$, and $B_r$ are initial samples, r represents ¼ (one-quarter) resolution samples, and s represents actual resolution samples.

Example 26 includes the subject matter of Example 25, wherein missing RGB channel values are interpolated by computing $\widehat{\Delta_{GR_s}}=f(\Delta_{GR_r})$ and $\widehat{\Delta_{GB_s}}=f(\Delta_{GB_r})$, where f is a bilinear interpolator.

Example 27 includes the subject matter of Example 26, wherein color values are retrieved by evaluating $R_{s-r}=G_{s-r}+\widehat{\Delta_{GR_{s-r}}}$ and $B_{s-r}=G_{s-r}+\widehat{\Delta_{GB_{s-r}}}$.

Example 28 includes the subject matter of any of Examples 16-27 and 29, wherein before processing the 3D graphics data with the color mask, the method further comprises: performing at least one of vertex processing, tessellation, geometry processing, and/or rasterization on the 3D graphics data.

Example 29 is a computer-readable medium encoded with instructions that, when executed by one or more processors, causes a process for compressed three-dimensional (3D) graphics rendering to be carried out, the process including the subject matter of any of Examples 16-28.

Example 30 is a graphics processing unit (GPU) comprising: a pixel processing module configured to process three-dimensional (3D) graphics data with a color mask having a shading pattern which renders green pixels at a higher resolution than red pixels and blue pixels, the 3D graphics data having undergone at least one of vertex processing, tessellation, geometry processing, and/or rasterization upstream of the pixel processing module; a reconstruction module configured to receive 3D graphics data processed by the pixel processing module and to reconstruct missing red-green-blue (RGB) channel values.

Example 31 includes the subject matter of any of Examples 30 and 32-37, wherein the reconstruction module is programmed with at least one of a de-mosaicking algorithm that interpolates missing values utilizable in reconstructing missing RGB channel values and/or an interpolation algorithm that interpolates missing values utilizable in reconstructing missing RGB channel values.

Example 32 includes the subject matter of any of Examples 30-31 and 33-37, wherein an output of the GPU has a channel peak signal-to-noise ratio (PSNR) in the range of about 30-50 dB.

Example 33 includes the subject matter of any of Examples 30-32 and 34-37, wherein an output of the GPU has an average channel peak signal-to-noise ratio (PSNR) of about 40 dB±5 dB.

Example 34 includes the subject matter of any of Examples 30-33 and 35-37, wherein an output of the GPU has an average channel peak signal-to-noise ratio (PSNR) of about 43.5 dB±5 dB.

Example 35 includes the subject matter of any of Examples 30-34 and 36-37, wherein an output of the GPU has a S-CIELAB visual quality difference metric that is less than or equal to about 1.5.

Example 36 includes the subject matter of any of Examples 30-35 and 37, wherein an output of the GPU has a mean S-CIELAB visual quality difference metric of about 0.3±0.1.

Example 37 is a mobile computing device including the subject matter of any of Examples 30-36.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A graphics processing architecture comprising:
a graphics pipeline for processing computer-generated three-dimensional (3D) graphics data associated with a virtual scene, the graphics data representing red, green, and blue channels per each pixel location of the virtual scene, and the processing including at least one of vertex processing, tessellation, geometry processing, and rasterization;
a pixel processing module at least one of executable and controllable by one or more processors and configured to further process the computer-generated three-dimensional (3D) graphics data with green channel values at a higher resolution than red channel values and blue channel values to compute intermediate target data representing only one or two processed channel values of the red, green, and blue channel values per pixel location of the virtual scene that are subjected to pixel shading, such that one or two of the red, green, and blue channel values per pixel location are not subjected to pixel shading and thus are unprocessed; and
a reconstruction module at least one of executable and controllable by one or more processors and configured to receive the intermediate target data computed by the pixel processing module, and to reconstruct the one or two unprocessed red, green, and blue (RGB) channel values of the intermediate target data, thereby computing final target data for pixels of the virtual scene, the final target data being graphics data that represents the virtual scene and includes data of all the red, green, and blue channel values per each pixel location.

2. The graphics processing architecture of claim 1, wherein:
the pixel processing module processes the computer-generated 3D graphics data with green channel values at ½ (one-half) resolution and red channel values and blue channel values at ¼ (one-quarter) resolution; or the pixel processing module processes the computer-generated 3D graphics data with green channel values at actual resolution and red channel values and blue channel values at ¼ (one-quarter) resolution.

3. The graphics processing architecture of claim 1, wherein the reconstruction module is configured with at least one of a de-mosaicking algorithm that interpolates unprocessed RGB channel values utilizable in reconstructing unprocessed RGB channel values and an interpolation algorithm that interpolates unprocessed RGB channel values utilizable in reconstructing unprocessed RGB channel values.

4. The graphics processing architecture of claim 1, wherein the reconstruction module is configured to:
calculate luminance for green channel values represented by the intermediate target data;
interpolate unprocessed RGB channel values from the resultant luminance calculation; and
retrieve color values at original resolution based on the resultant interpolated RGB channel values.

5. The graphics processing architecture of claim 4, wherein the luminance for green channel values represented by the intermediate target data is calculated by $$L(x, y) = \frac{1}{4}(R(x, y) + 2G(x, y) + B(x, y)),$$

where L is luminance, R refers to red channel values, G refers to green channel values, and B refers to blue channel values.

6. The graphics processing architecture of claim 5, wherein the luminance for green channel values represented by the intermediate target data is calculated using an adaptive filter configured to filter green channel values captured with the filter:

$$\begin{pmatrix} 0 & 1 & -2 & 1 & 0 \\ 1 & -4 & 6 & -4 & 1 \\ -2 & 6 & 56 & 6 & -2 \\ 1 & -4 & 6 & -4 & 1 \\ 0 & 1 & -2 & 1 & 0 \end{pmatrix} / 64.$$

7. The graphics processing architecture of claim 5, wherein unprocessed RGB channel values are interpolated by:
computing $\Delta_{LC} = L_C - C_C$, where $C = \{R, G, B\}$ and $C_C$ represents channel values where color C is rendered; and
evaluating $\widehat{\Delta_{LC}} = f(\Delta_{LC})$, where f is a bilinear interpolator.

8. The graphics processing architecture of claim 7, wherein color values are retrieved by evaluating $C = L + \widehat{\Delta_{LC}}$.

9. The graphics processing architecture of claim 1, wherein the reconstruction module is configured to:
compute primary color differences (PCDs);
interpolate unprocessed RGB channel values from the resultant PCDs; and
retrieve color values at original resolution based on the resultant interpolated RGB channel values.

10. The graphics processing architecture of claim 9, wherein the PCDs are computed by $\Delta_{GB_r} = G_r - B_r$ and $\Delta_{GR_r} = G_r - R_r$, where:
$R_r$, $G_s$, and $B_r$ are initial samples, wherein $G_r$ is a sub-set of $G_s$ where r pixels are rendered;

r represents locations where color channel values R and B are subjected to pixel shading ¼ (one-quarter) resolution samples; and s represents actual resolution samples.

11. The graphics processing architecture of claim 10, wherein unprocessed RGB channel values are interpolated by computing $\widehat{\Delta_{LC}}=f(\Delta_{GR_r})$ and $\widehat{\Delta_{GB_s}}=f(\Delta GB_r)$, where f is a bilinear interpolator.

12. The graphics processing architecture of claim 11, wherein color values are retrieved by evaluating $R_{s-r}=G_{s-r}+\widehat{\Delta_{GB_{s-r}}}$ and $B_{s-r}=G_{s-r}+\widehat{\Delta_{GR_{s-r}}}$, where:

$R_{s-r}$ represents unprocessed R channel values to be calculated;

$B_{s-r}$ represents unprocessed B channel values to be calculated;

s-r refers to set s-set r, representing channel values not subjected to pixel shading for all colors completely; and G channel value intensities are from full resolution at pixel locations of the virtual scene where R channel or B channel are unprocessed.

13. A non-transitory computer-readable medium encoded with instructions that, when executed by one or more processors, causes a process for compressed three-dimensional (3D) graphics rendering to be carried out, the process comprising:

processing computer-generated three-dimensional (3D) graphics data associated with a virtual scene, the graphics data representing red, green, and blue channels per each pixel location of the virtual scene, and the processing including at least one of vertex processing, tessellation, geometry processing, and rasterization;

processing computer-generated 3D graphics data with green channel values at a higher resolution than red channel values and blue channel values to compute intermediate target data representing only one or two processed channel values of the red, green, and blue channel values per pixel location of the virtual scene that are subjected to pixel shading, such that one or two of the red, green, and blue channel values per pixel location are not subjected to pixel shading and thus are unprocessed; and reconstructing the one or two unprocessed red, green, and blue (RGB) channel values of the intermediate target data, thereby computing final target data for pixels of the virtual scene, the final target data being graphics data that represents the virtual scene and includes data of all the red, green, and blue channel values per each pixel location.

14. The computer-readable medium of claim 13, wherein:

the computer-generated 3D graphics data is processed with green channel values at ½ (one-half) resolution and red channel values and blue channel values at ¼ (one-quarter) resolution; or the computer-generated 3D graphics data is processed with green channel values at actual resolution and red channel values and blue channel values at ¼ (one-quarter) resolution.

15. The computer-readable medium of claim 13, wherein reconstructing unprocessed RGB channel values comprises:

calculating luminance for green channel values represented by the intermediate target data;

interpolating unprocessed RGB channel values from the resultant luminance calculation; and retrieving color values at original resolution based on the resultant interpolated RGB channel values.

16. The computer-readable medium of claim 15, wherein the luminance for green channel values represented by the intermediate target data is calculated by $$L(x, y) = \frac{1}{4}(R(x, y) + 2G(x, y) + B(x, y)),$$

where L is luminance, R refers to red channel values, G refers to green channel values, and B refers to blue channel values.

17. The computer-readable medium of claim 16, wherein the luminance for green channel values represented by the intermediate target data is calculated using an adaptive filter configured to filter green channel values captured with the filter:

$$\begin{pmatrix} 0 & 1 & -2 & 1 & 0 \\ 1 & -4 & 6 & -4 & 1 \\ -2 & 6 & 56 & 6 & -2 \\ 1 & -4 & 6 & -4 & 1 \\ 0 & 1 & -2 & 1 & 0 \end{pmatrix} / 64.$$

18. The computer-readable medium of claim 16, wherein unprocessed RGB channel values are interpolated by:

computing $\Delta_{LC}=L_C-C_C$ where $C=\{R,G,B\}$ and $C_C$ represents channel values where color C is rendered; and evaluating $\widehat{\Delta_{LC}}=f(\Delta_{LC})$, where f is a bilinear interpolator.

19. The computer-readable medium of claim 18, wherein color values are retrieved by evaluating $C=L+\widehat{\Delta_{LC}}$.

20. The computer-readable medium of claim 13, wherein reconstructing missing RGB channel values comprises:

computing primary color differences (PCDs);

interpolating unprocessed RGB channel values from the resultant PCDs; and retrieving color values at original resolution based on the resultant interpolated RGB channel values.

21. The computer-readable medium of claim 20, wherein the PCDs are computed by $\Delta_{GB_r}=G_r-B_r$ and $\Delta_{GR_r}=G_r-R_r$, where:

$R_r$, $G_s$, and $B_r$ are initial samples, wherein $G_r$ is a sub-set of $G_s$ where r pixels are rendered;

r represents locations where color channel values R and B are subjected to pixel shading as ¼ (one-quarter) resolution samples; and s represents actual resolution samples.

22. The computer-readable medium of claim 21, wherein unprocessed RGB channel values are interpolated by computing $\widehat{\Delta_{LC}}=f(\Delta_{GR_r})$ and $\widehat{\Delta_{GB_s}}=f(\Delta_{GB_r})$, where f is a bilinear interpolator.

23. The computer-readable medium of claim 22, wherein color values are retrieved by evaluating $R_{s-r}=G_{s-r}+\widehat{\Delta_{GB_{s-r}}}$ and $B_{s-r}=G_{s-r}+\widehat{\Delta_{GB_{s-r}}}$, where:

$R_{s-r}$ represents unprocessed R channel values to be calculated;

$B_s$ represents unprocessed B channel values to be calculated;

s-r refers to set s-set r, representing channel values not subjected to pixel shading for all colors completely; and G channel value intensities are from full resolution at pixel locations of the virtual scene where R channel or B channel are unprocessed.

24. A graphics processing unit (GPU) comprising:
 a graphics pipeline for processing computer-generated three-dimensional (3D) graphics data associated with a virtual scene, the graphics data representing red, green, and blue channels per each pixel location of the virtual scene, and the processing including at least one of vertex processing, tessellation, geometry processing, and rasterization;
 a pixel processing module at least one of executable and controllable by one or more processors and configured to further process computer-generated three-dimensional (3D) graphics data with green channel values at a higher resolution than red channel values and blue channel values to compute intermediate target data representing only one or two processed channel values of the red, green, and blue channel values per pixel location of the virtual scene that are subjected to pixel shading, such that one or two of the red, green, and blue channel values per pixel location are not subjected to pixel shading and thus are unprocessed; and
 a reconstruction module at least one of executable and controllable by one or more processors and configured to receive the intermediate target data computed by the pixel processing module and to reconstruct unprocessed red, green, and blue (RGB) channel values of the intermediate target data, thereby computing final target data for pixels of the virtual scene, the final target data being graphics data that represents the virtual scene and includes data of all the red, green, and blue channel values per each pixel location.

25. The GPU of claim 24, wherein the reconstruction module is programmed with at least one of a demosaicking algorithm that interpolates unprocessed RGB channel values utilizable in reconstructing unprocessed RGB channel values and an interpolation algorithm that interpolates unprocessed RGB channel values utilizable in reconstructing unprocessed RGB channel values.

\* \* \* \* \*